United States Patent
Markley et al.

(10) Patent No.: US 7,059,985 B2
(45) Date of Patent: Jun. 13, 2006

(54) ALTERNATING GUIDE POWER TRANSMISSION CHAIN

(75) Inventors: George L. Markley, Montour Falls, NY (US); Mark MacDonald Wigsten, Lansing, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 09/907,021

(22) Filed: Jul. 17, 2001

(65) Prior Publication Data

US 2003/0017896 A1    Jan. 23, 2003

(51) Int. Cl.
*F16G 13/04* (2006.01)
*F16G 13/02* (2006.01)

(52) U.S. Cl. ...................... 474/213; 474/206

(58) Field of Classification Search ........ 474/212–214, 474/229, 202, 148, 152–156, 157, 161, 206
See application file for complete search history.

(56) References Cited

U.S. PATENT DOCUMENTS

| | | | |
|---|---|---|---|
| 1,201,748 A * | 10/1916 | Luce .......................... 474/213 |
| 1,269,656 A * | 6/1918 | Stewart ....................... 474/213 |
| 1,463,789 A * | 8/1923 | Braddock ..................... 474/213 |
| 1,956,942 A * | 5/1934 | Belcher et al. ............... 474/139 |
| 2,223,314 A | 11/1940 | Cumfer |
| 4,010,656 A | 3/1977 | Jeffrey |
| 4,509,937 A * | 4/1985 | Ledvina et al. .............. 474/213 |
| 5,397,280 A | 3/1995 | Skurka |
| 5,690,571 A | 11/1997 | Mott .......................... 474/212 |
| 5,967,926 A * | 10/1999 | Kozakura et al. ........... 474/213 |
| 5,989,140 A * | 11/1999 | Ichikawa et al. ........... 474/148 |
| 6,171,209 B1 * | 1/2001 | Matsuda ..................... 474/212 |
| 6,267,701 B1 * | 7/2001 | Mott .......................... 474/148 |
| 6,685,589 B1 | 2/2004 | Horie et al. |

FOREIGN PATENT DOCUMENTS

| | | |
|---|---|---|
| DE | 25 04 050 | 8/1975 |
| DE | 197 21 944 | 11/1998 |
| EP | 0 178 818 | * 4/1986 |

* cited by examiner

*Primary Examiner*—Marcus Charles
(74) *Attorney, Agent, or Firm*—McAndrews, Held & Malloy, Ltd.; Greg Dziegielewski

(57) ABSTRACT

A power transmission chain has rows of pivotally connected, interleaved drive links and guide links. One guide link is included in each row of links and the guide links are positioned on alternate lateral sides of the chain in each row. A sprocket that can engage the power transmission chain has teeth that extend radially outwardly at the periphery of the sprocket. The sprocket teeth are separated from adjacent teeth by a distance that is approximately the length of the links of the chain.

4 Claims, 5 Drawing Sheets

ALTERNATING GUIDE POWER TRANSMISSION CHAIN

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

A power transmission chain transmits power from a driving sprocket to one or more driven sprockets by forming an endless loop that wraps and engages the teeth of the sprockets. Rotation of the driving sprocket moves the chain thereby transmitting power through the chain to rotate the driven sprockets engaged by the chain. Power transmission chains are widely used in the automotive industry. In an engine timing application, a chain transmits power from at least one driving sprocket positioned on a crankshaft to at least one driven sprocket positioned on a camshaft. Other automotive applications of power transmission chains include transmitting power from a torque converter to a transmission and transmitting power in the transfer case of a four wheel drive vehicle. Power transmission chains are also widely used in industrial applications.

One type of power transmission chain is known as a "silent chain." A typical silent chain comprises an endless loop formed by a series of links that are adjacent to each other along the chain and that are rotatably joined to adjacent links. Each link extends a distance in a chain direction between locations at which it is rotatably joined to adjacent links and conventionally forms two teeth that are adjacent to each other along the chain direction of the link. The teeth of a link are formed to engage the teeth of a sprocket and extend in a front direction that is perpendicular to the chain direction. Links of a silent chain also conventionally form two apertures, one near each end of the link along the chain direction. The apertures extend through the link in a lateral direction that is perpendicular to the chain direction and perpendicular to the front direction of the link. The links of a silent chain are typically formed by a row of substantially identical flat links, each forming teeth and apertures as described, that are positioned laterally adjacent to each other to collectively form a link of the chain.

A silent chain is formed by positioning rows of flat links adjacent to each other and partially overlapping along the chain direction so that apertures at adjacent ends of links are aligned. Pivots, such as pins, extend through the aligned apertures to rotatably join adjacent links. Rows of links are joined in this manner to form an endless loop in which the front direction of the links, the direction that the teeth extend from the chain links, is directed toward the region within the endless loop. Links having teeth extending into the region within the loop are referred to as inverted tooth links. The surface of the chain, along which the teeth extend, is referred to as the front side of the chain. The surface of the chain opposite the front side, facing outwardly from the region within the endless loop, is the back side of the chain.

The inverted tooth links (sometimes referred to as driving links) transfer power between the chain and a sprocket along the chain direction. Each tooth of a link defines an inside flank that faces generally along the chain direction toward the adjacent tooth of the link, and an outside flank that faces away from the inside flank of the tooth. The inside flanks of the teeth of an inverted tooth link meet at a crotch between the teeth. The teeth of a link may contact sprocket teeth along their inside flanks, along their outside flanks, or along both flanks. The contact between a link tooth flank and a sprocket tooth may transfer power or may be an incidental contact. Teeth of an inverted tooth link conventionally contact a sprocket on a flank of a sprocket tooth or at a root between adjacent sprocket teeth.

Inverted tooth links are positioned on a sprocket by contact with three sprocket teeth, one at each end of the link along the chain direction, and one between the teeth of the link. A row of links is positioned on a sprocket by contact of the teeth of the links comprising the row with sprocket teeth, by contact by outside flanks of teeth of the links of the adjacent rows, or by both. Contact with the sprocket at three locations along the chain direction limits motion of the row of links along the teeth of the sprocket.

Silent chains often include guide links. Guide links are conventionally flat plates that are positioned on the lateral outside edges of alternate rows of inverted tooth links. The guide links do not form teeth and are generally adjacent to the row of inverted tooth links. The guide links extend adjacent to the region between teeth of the inverted tooth links. The guide links on opposite lateral sides of a row are separated by approximately the lateral width of the sprocket teeth that extend between the teeth of the row of links. The guide links thereby act to position the chain laterally on a sprocket (i.e., maintain the chain on the center of the sprocket) but do not engage a sprocket between teeth of the sprocket. Guide links also increase the strength and stiffness of the chain.

Conventionally, the guide links on opposite lateral sides of a silent chain are aligned. Chains having guide links that are laterally aligned are generally stiffer and stronger at locations along the chain where guide links are located than at locations that do not have guide links. The chain must be designed to assure that the less strong locations without guide links are sufficiently strong. The cross-sections with guide links are stronger than the sections not having guide links and are therefore stronger than necessary. The cross sections with guide links have more material than is necessary, making the chain heavier than necessary.

A conventional silent chain drive is comprised of an endless loop silent chain that wraps at least two sprockets. Each sprocket is mounted to a shaft. Rotation of the shaft on which the driving sprocket is mounted transmits power from the driving sprocket through the chain to rotate a driven sprocket and the shaft to which the driven sprocket is mounted. FIG. 1 illustrates such a basic arrangement. A chain 3 forms an endless loop and partially wraps driving sprocket 1 and driven sprocket 2 that are within the loop. A front side 4 of the chain 3 is adjacent to the region within the endless loop formed by the chain 3. Teeth extend inwardly along the front side 4 to engage teeth of both the driving sprocket 1 and the driven sprocket 2. The back side 5 of the chain 3 is the side of the chain opposite the front side 4 and faces outwardly from the chain loop. Both the driving sprocket 1 and the driven sprocket 2 rotate in the same direction, shown counter-clockwise by FIG. 1.

Silent chains may also drive sprockets that engage the back side of the chain. Examples of devices that are driven by the back side of a silent chain (back-driven) include water pumps, injector pumps, and countershafts. FIG. 1 also shows a sprocket 6 that is back-driven by the chain 3. The driven sprocket 2 engages the teeth on the front side 4 of the chain 3 and rotates in the same direction as the driving sprocket 1, counter-clockwise in FIG. 1. Teeth of the back-driven sprocket 6 engage the back side 5 of the chain 3. The back-driven sprocket 6 rotates in the opposite direction of the driven sprocket 2.

Often, the back side of the links of a chain that engages and drives a sprocket is configured to engage a sprocket as a single tooth between two adjacent sprocket teeth. The teeth of sprockets engaged by the back side of such links are spaced apart by the length of the chain link. Consequently, these sprockets engage a chain link in fewer and farther separated locations than do front driven sprockets. This can result in a lower capacity for power transmission by back-driven sprockets. The lower power transmission capacity is acceptable in some applications because back-driven sprockets are frequently located in the slack region of the chain and/or are not required to transmit forces that are as large as can be transmitted by the front side of the silent chain.

Silent chain drives create noise at a variety of sources. One significant source of noise is the impact of sprocket teeth on chain teeth at the onset of engagement of the sprocket by the chain teeth. Among the factors that affect the level of the noise created by this impact are the velocity of impact between the chain and the sprocket and the mass of chain links contacting the sprocket. Noise created by engaging impact in silent chain drives is generally periodic with a frequency generally corresponding to the frequency of the chain teeth engaging sprocket teeth. This frequency is related to the number of teeth on the sprocket and the speed of the sprocket. The impacts can produce sound having objectionable pure sonic tones.

Chordal motion of a chain is another source of noise in power transmission chain drives, including silent chain drives, that is associated with engagement of a chain and sprocket. Chordal motion occurs as a chain link initially engages and begins to move with a sprocket. The sprocket can cause a movement of the span of free chain that is approaching the sprocket along the front to back direction of the chain. This vibratory movement, known as chordal fall, can also produce an objectionable pure sonic tone at the frequency of the chain mesh frequency or a multiple of it.

FIG. 2 illustrates chordal fall. As described above, chains are comprised of a series of pivotally joined rigid links. Consequently, chains are not continuously flexible and do not wrap a sprocket as a circular arc. Rather, a chain wraps around a sprocket in a series of line segments, or chords. As a silent chain engages a sprocket, the individual link teeth contact the surfaces of a sprocket tooth and extend between adjacent teeth of the sprocket. This contact forces the links to rotate around pivot joints with respect to adjacent links. The chain thus bends at the pivot joints between adjacent links as it engages and wraps around a sprocket.

FIG. 2 shows a chord C, which joins the pivot points A and B of a chain link at the position at which the point A engages a sprocket from a free chain run along a direction F. The chord C' joins the pivot points at positions A' and B' where the point A has moved with the sprocket half way to the point B location. As shown, by moving from the location A to the location A' the point A has moved a distance R in the direction T that is perpendicular to the direction F along the free span of the chain. The distance R is the chordal fall of the chain.

Because a chain repeatedly engages teeth, as described above, the change in position of the chain between repeated engagement of the sprocket causes is chordal fall. The chordal fall is proportional to the length of C between pivots and inversely proportional to the radius of the circular path traveled by the points A and B around the center of a sprocket. The longer that the distance between points at which the chain pivots to engage the sprocket, the chain pitch, the greater chordal fall will be. The smaller the radius of the circular path traveled by the points A and B around the center of a sprocket, the greater the chordal fall will be. For example, a chain with a long pitch engaging a sprocket with relatively small diameter will experience a pronounced amount of chordal fall. In contrast, for an ideal toothless belt engaging a smooth pulley continuously, the length of chord C will be infinitely small, and consequently the belt will experience no chordal fall.

Back-drive chain and sprocket engagement can exacerbate the problem of chordal fall by permitting greater uncontrolled chordal fall movement of a chain on a sprocket than occurs for front drive engagement. A tooth of a front-driven sprocket extends between teeth of a link on the front side of the chain, and two adjacent sprocket teeth engage the link at its ends along the chain direction, one adjacent to each tooth outer flank of the inverted tooth link. A tooth of a back-driven sprocket can only engage the back side of the chain between links along the chain direction. Because the back driven sprocket engages the chain at fewer and more widely separated locations than the front driven sprocket, the chordal fall motion increases due to inability of the chain and sprocket contact to control the chordal fall motion.

One method for decreasing chordal fall motion at back-driven sprockets is to use chains formed by interleaved flat links, that is a flat link is laterally adjacent to ends of two links that are aligned with and adjacent to each other along the chain direction. Sprocket teeth can extend into the back side of this chain at a distance that is only half the length of the link by alternately extending between links of laterally adjacent rows of teeth. The sprocket teeth must be in a series extending around the periphery of the sprocket and the teeth of adjacent series must be offset with respect to each other along the periphery of the sprocket. FIG. 3 shows a back drive sprocket with offset series of teeth, i.e. the teeth are not laterally aligned. In this arrangement, sprocket teeth only extend into the back side of the chain between links. However, the distance along the chain direction at which the chain successively engages the back drive sprocket is about half the length of a chain link. Consequently, the back-driven sprocket engages chain at three locations along the chain direction for each row of links.

The three offset series of teeth on the sprocket, as shown in FIG. 3, however, increase the expense of manufacturing the sprocket. When back-driven sprockets are not required to transmit high loads, moreover, the additional expense of the offset series of sprocket teeth is not required to assure adequate power transmission. Therefore, it is desirable to provide a more cost-effective way of limiting chordal fall motion in low load applications.

Thus, a need remains for a power transmission chain having a more uniform stiffness along its length then has been known. Further, a need also exists for a power transmission chain that engages a sprocket at both the front and back sides while maintaining control of chordal fall motion without requiring expensive and difficult to manufacture sprockets to engage the backside of the chain.

BRIEF SUMMARY OF THE INVENTION

In accordance with the present invention, disadvantages of chains having laterally aligned guide links and disadvantages of chains engaging sprockets at both the front and back sides of the chain have been overcome. A chain according to the present invention has guide links that are offset from each other along the chain creating a more uniform stiffness along the chain than conventional chains having guide links that are laterally adjacent to each other. Further, a chain and sprocket according to the present invention having offset guide links provides control over chordal fall in back driven applications.

A chain according to the present invention has a first series of links extending along the chain and a second series of links extending along the chain. The series of links form an endless loop. The direction along the link is the chain direction. The direction toward the region within the loop, is the front direction. The direction opposite the front direction, away from the region within the endless loop is the back direction. The direction perpendicular to the chain direction and perpendicular to the front and back directions is the lateral direction of the chain.

The first and second series of links are offset from each other along the chain direction so that a link of one series extends from one link of the other series to the next of the other series. Each series of links comprises rows of links that are positioned along the chain direction to form the series of links. Each row of links includes a guide link and one or more drive links. The guide link of each row is laterally separated from the drive links of the row by a distance that permits a drive link of the other series to be interleaved between the guide link and the drive links. The guide links of the first series are offset in a first lateral direction from the drive links of the first series. The guide links of the second series of links is offset in a second lateral direction from the drive links of the second series that is opposite the first lateral direction.

The rows of links of the first series are offset along the chain direction from the rows of links of the second series. A chain according to the present invention is formed by the rows of links of the first and second series being interleaved along the length of the chain. Drive links of each row of links of the first series are interleaved between guide links and drive links of two adjacent rows of links of the second series. Drive links of each row of links of the second series are interleaved between guide links and drive links of two adjacent rows of links of the first series. The interleaved rows are pivotally joined to each other.

According to the invention, a sprocket having teeth that extend radially outwardly at the periphery of the sprocket will support the backside of a chain according to the present invention at a desired radial location along the sprocket teeth. The sprocket teeth are arranged in series around the periphery of the sprocket, with teeth of adjacent series offset along the periphery. The sprocket teeth of each series are separated from adjacent teeth by a distance that is approximately the length of the drive links of the chain. The sprocket engages a chain according to the present invention by positioning adjacent teeth of one series between adjacent drive links of one series of chain links, and positioning adjacent teeth of the other series of sprocket teeth between adjacent teeth of the other series of chain links. The sprocket teeth engage the drive links for driving contact at link surfaces at ends of the link along the chain direction. As is evident from the description of a power transmission chain according to the invention, the sprocket teeth of one series are offset along the periphery of the sprocket with respect to the sprocket teeth of the other series so that one series of sprocket teeth engage one series of chain links, and the other series of sprocket teeth engage the other series of chain links.

A preferred embodiment of the invention includes a sprocket having a first series of teeth and a second series of teeth. The teeth in each row are separated from adjacent teeth of the series a distance that is approximately the length of the drive links of a chain. The series of sprocket teeth are offset from each other in the lateral direction of the chain and along the periphery of the sprocket.

The drive links and guide links may have apertures near opposed ends in the chain direction that are configured to accept a pin so that the drive links and guide links can articulate about the pin.

One embodiment of the present invention provides drive links having two inverted teeth at the front side of the link and positioned adjacent to each other along the chain direction. The teeth are configured to be accepted by a conventional front drive sprocket. The back side of the drive link comprises flanks at opposed ends of the link along the chain direction that are configured so that the back side of the drive link is accepted between adjacent sprocket teeth of a back drive sprocket.

An alternative embodiment provides drive links comprising a front side and a back side that comprise flanks at opposed ends of the link along the chain direction that are configured so that the drive link is accepted between adjacent sprocket teeth of a sprocket. The front and back side of the drive link may be substantially identical.

The objects and advantages of the present invention, as well as details of preferred embodiments thereof, will be more fully understood from the drawings and the following description.

DETAILED DESCRIPTION OF THE INVENTION

Figure 1:
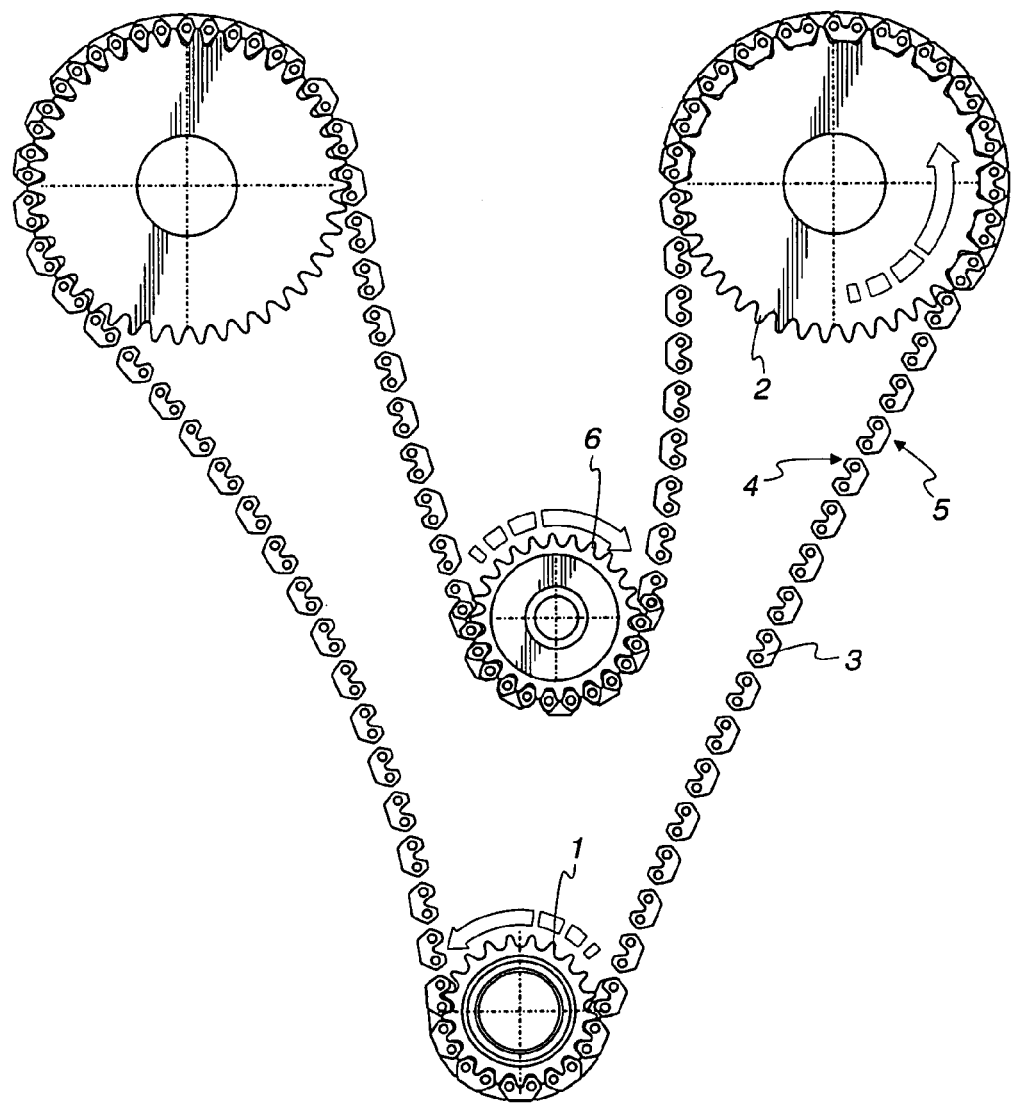
FIG. 1 is a side view of a power transmission chain engaging sprockets for front-drive and engaging a sprocket for back-drive.
Figure 2:
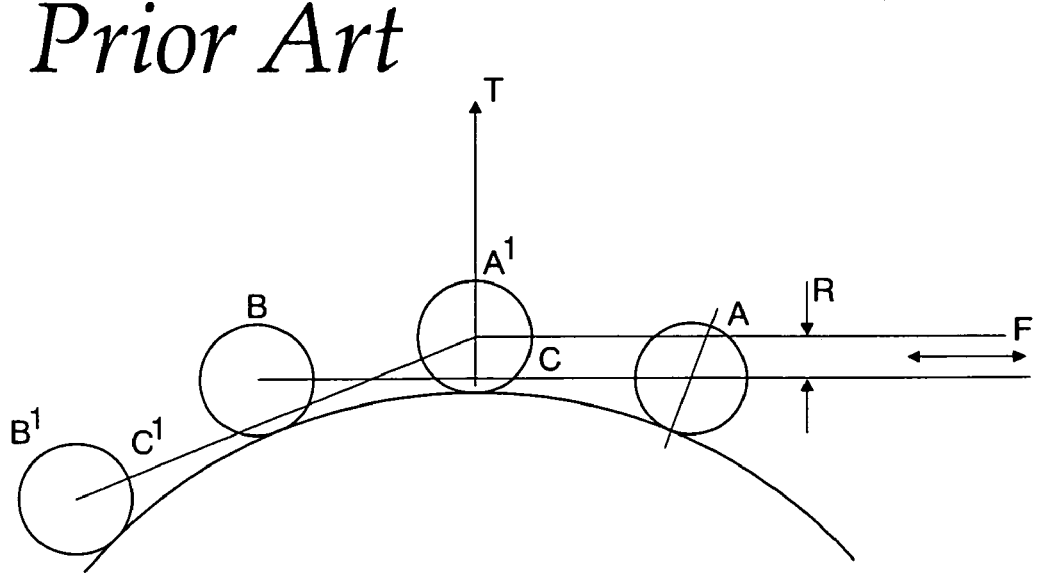
FIG. 2 is a side view illustration of chordal fall of a power transmission chain engaging a sprocket.
Figure 3:
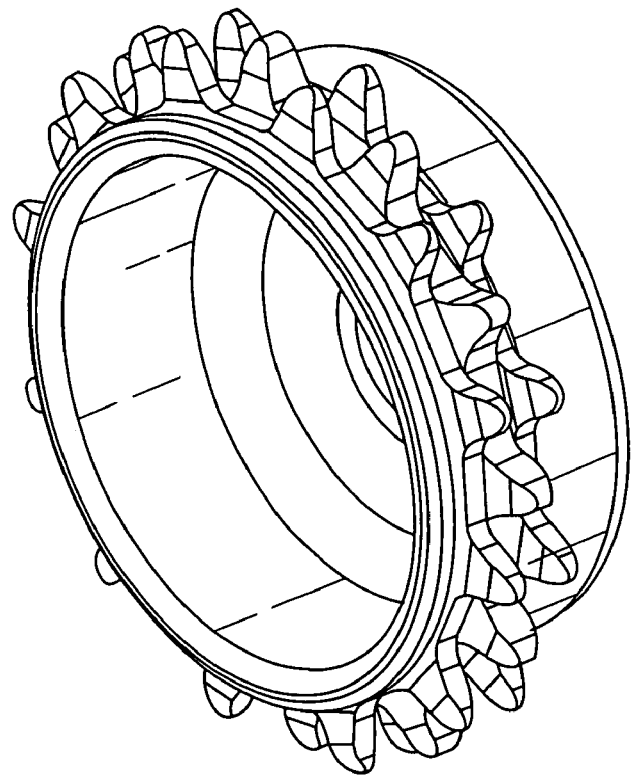
FIG. 3 is an oblique view of a sprocket having three series of teeth staggered from adjacent series along the periphery of the sprocket.
Figure 4:
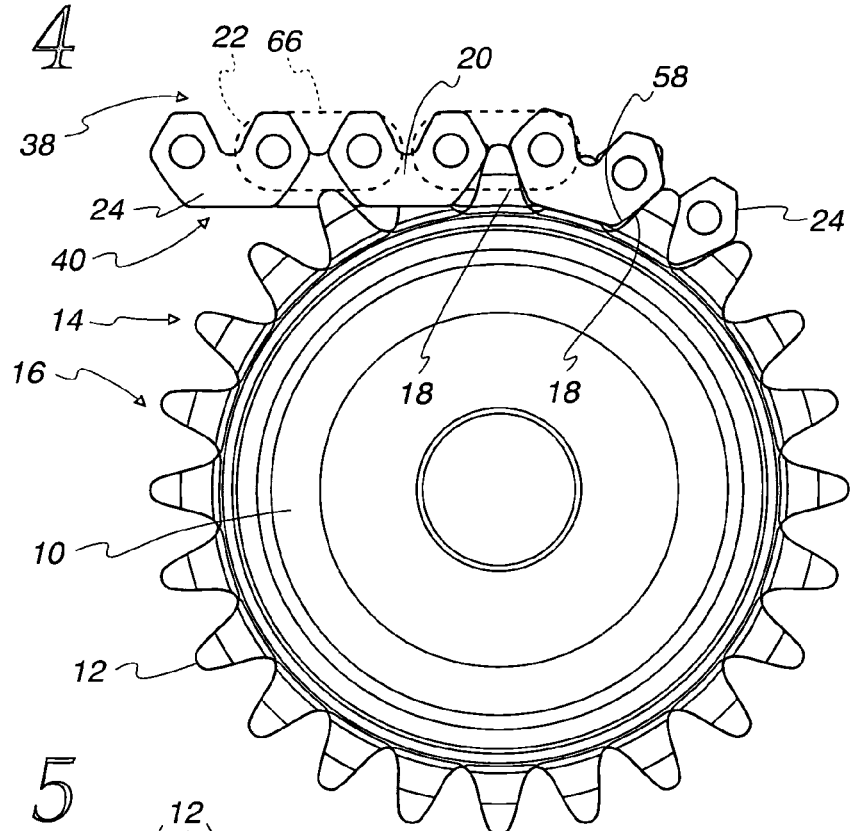
FIG. 4 is a side view of a section of a silent chain and a sprocket according to the present invention in back-drive engagement.
Figure 5:
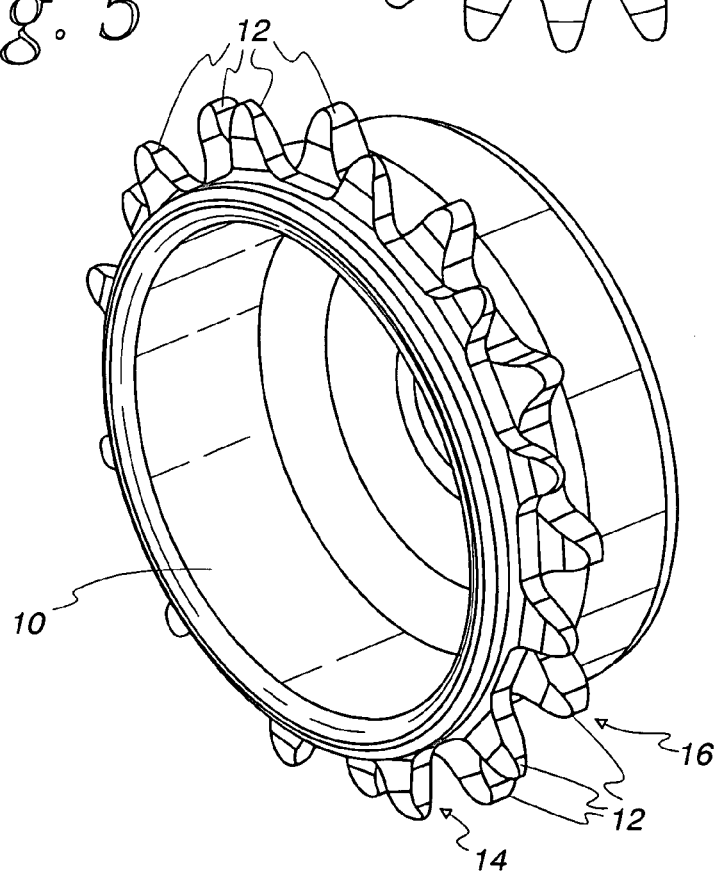
FIG. 5 is an oblique view of the sprocket shown by FIG. 4.

FIG. 4 shows an embodiment of the present invention wherein a sprocket 10 engages a silent chain 20. The chain 20 has a front side 38 and a back side 40. As shown by FIGS. 4 and 5, the sprocket 10 is generally cylindrical and has teeth 12 that extend radially outwardly from the periphery of the sprocket 10. The teeth 12 of the sprocket 10 engage the backside 40 of the chain 20. As compared to a sprocket that engages the front side of the chain 20, the sprocket 10 omits half of each tooth from alternate lateral sides to form teeth 12 that are half the width of teeth of a front side sprocket. The width of the teeth 12 provides clearance so that a link 24 can be positioned laterally adjacent to the teeth 12 as shown by FIG. 4.

Sprocket teeth 12 are spaced around the peripheral circumference of the sprocket 10 in two parallel series, a first series 14 and a second series 16. Each series 14 and 16 extends around the circumference of the sprocket 10. The first series 14 is offset from the second series 16 along an axial direction of the sprocket 10 that is perpendicular to the series 14 and 16. The teeth 12 of the series 14 are offset along the circumference of the sprocket 10 with respect to the teeth 12 of the series 16 so that each tooth 12 of the series 14 is positioned between adjacent teeth 12 of the series 16. Similarly, each tooth 12 of the series 16 is positioned along the circumference of the sprocket 10 between adjacent teeth 12 of the series 14. The sprocket 10 having two series of teeth 12 that are offset from each other along the circumference is less expensive to manufacture than a sprocket with more offset series, as the sprocket 10 may be cast in a two-piece mold and then be machined relatively easily.

Figure 6:
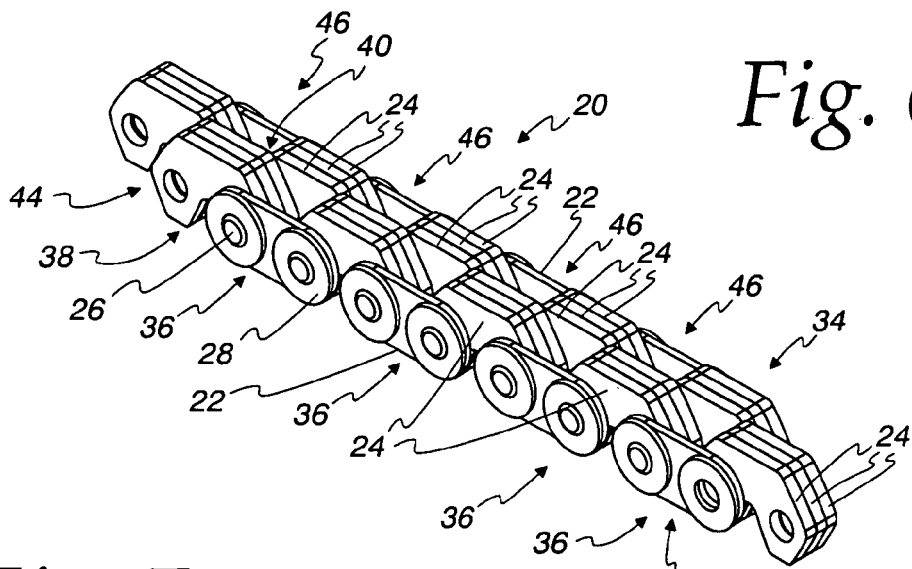
FIG. 6 is an oblique view of a section of the power transmission chain shown by FIG. 4.
Figure 7:
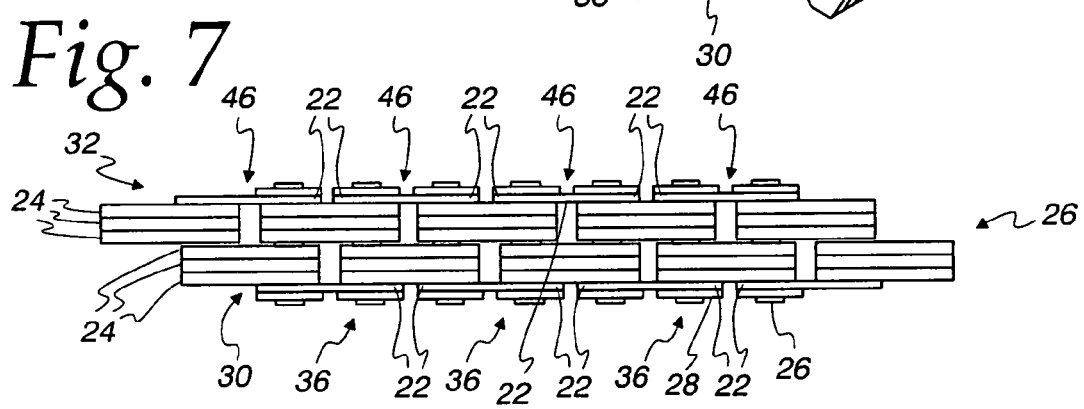
FIG. 7 is a plan view of a section of the power transmission chain shown by FIG. 4.

As best shown by FIGS. 6 and 7, the chain 20 is formed by rows of drive links 24 and guide links 22. A first series 34 is formed by rows 36 of links 22 and 24. The rows 36 are positioned along a chain direction and are each separated from the preceding and following rows 36. Each row 36 has three side-by-side drive links 24 and a guide link 22 that is separated from the three drive links 24 in a first lateral direction that is perpendicular to the chain direction, and perpendicular to the front and back directions. A second series 44 is formed by rows 46 of links 22 and 24 that are positioned along the chain direction and are each separated from the preceding and following rows 46. Each row 46 has three side-by-side drive links 24 and a guide link 22 that is separated from the three drive links 24 in a second lateral direction that is opposite from the first lateral direction.

Series 34 and 44 form the chain 20 by interleaving the rows 36 and 46 along the chain direction. As shown by FIGS. 6 and 7, each row 36 is separated from adjacent rows 36 along the chain direction by a distance that is less than the length of the links 24 and 22 along the chain direction. Similarly, each row 46 is separated from adjacent rows 46 by a distance that is less than the length of the links 24 and 22 along the chain direction. The guide links 22 of the rows 36 and 46 are separated from the drive links 24 of the row by a distance that allows the drive links 24 of an adjacent row to be positioned between the guide link 22 and the drive links 24.

Each row 36 is positioned between two adjacent rows 46 so that the drive links 24 of the adjacent rows 46 extend between the guide link 22 and the drive links 24 of the row 36, one adjacent row 46 at each end of the row 36 along the chain direction. The guide links 22 of the rows 46 extend adjacent to the drive links 24 of the row 36 at opposite ends along the chain direction of the row 36. Because the guide links 22 of the rows 46 are on the opposite lateral side of the chain 20 from the guide link 22 of the row 36, guide links 22 are on alternate lateral sides of the chain 20 for adjacent rows 36 and 46 along the chain 20. Because each row 36 and 46 has the same number of guide links 22 and drive links 24, a chain according to the present invention has a more uniform stiffness along its length than a chain having different numbers and types of links in each row.

Figure 8:
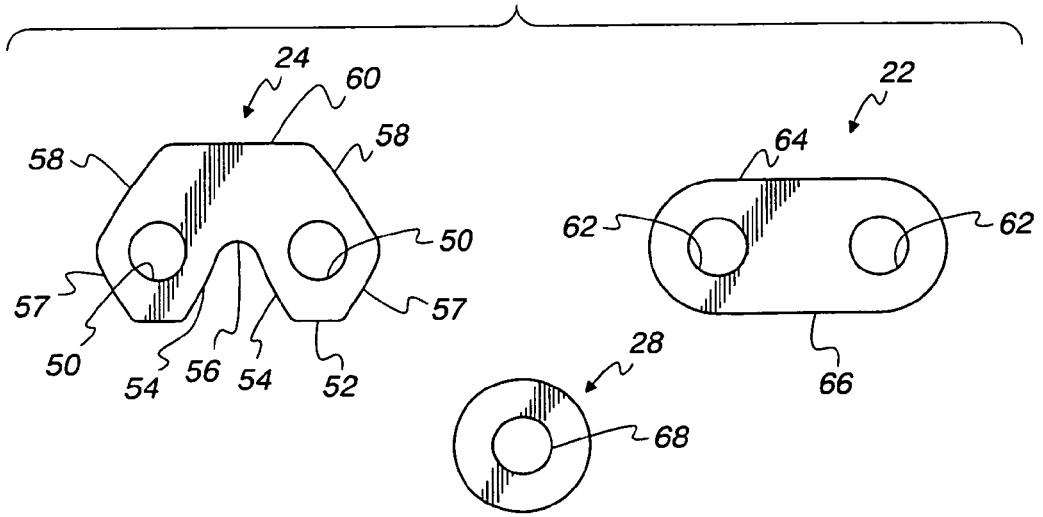
FIG. 8 is a side view of a drive link, guide link, and washer of the power transmission chain shown by FIG. 4.

As shown by FIG. 8, the drive links 24 of the chain 20 are generally flat plates. The drive links 24 define apertures 50 that are separated along the chain direction of the drive link 24. As is conventional for links of a silent chain, the apertures 50 are near the ends of the drive link 24 along the chain direction. As is also conventional for links of silent chains, the drive links 24 of the embodiment illustrated in FIGS. 4 and 6 define two teeth 52 that are adjacent to each other along the chain direction and that extend in the front direction. Each tooth 52 defines an outer flank 57 that faces in part along the chain direction away from the adjacent tooth 52 at an end along the chain direction of the link 24. Each tooth 52 defines an inner flank 54 that faces in part along the chain direction toward the adjacent tooth 52. The drive links 24 define a crotch 56 between inner flanks 54 of the teeth 52. The crotch 56 is located between the apertures 50. A back side of the drive link 24 comprises two back flanks 58, one each end of the link 24 along the chain direction. The back flanks 58 face in part along the chain direction and away from the drive link 24. A back surface 60 extends between the flanks 58.

The guide links 22 are flat plates that define two apertures 62 that are separated from each other along the chain direction of the guide link 22 by the same distance that the apertures 50 of the drive links 24 are separated. As is conventional, the guide links 22 form a front side edge 66 and a backside edge 64. The front side edge 66 and backside edge 64 are separated from the apertures 62 in the front direction and back direction respectively. As shown by FIG. 4, a guide link 22 that is laterally adjacent to a drive links 24, extends adjacent to the region between inner flanks 54 of a drive link 24. The guide links 22 extend in the back direction to position the backside edge 64 near the back surface 60 of the drive links 24.

As best shown by FIGS. 6 and 7, the drive links 24 and guide links 22 are adjacent in the lateral direction so that the apertures 50 of the drive links 24 are aligned with the apertures 62 of the guide links 22. The rows 36 and 46 are interleaved so that the apertures of interleaved rows are aligned along the lateral direction. Pins 26 are positioned to extend through the aligned apertures 50 and 62 and beyond the guide links 22 at opposite lateral sides of the chain 20. Washers 28 are flat plates that define an aperture 68. A washer 28 is positioned on the section of the pin 26 extending laterally beyond the guide links 22.

The pins 26 may be secured near their ends to the washers 28, such as by a press fit. The apertures 50 of the drive links 24 and the apertures 62 of the guide links 22 may be sized so that the drive links 24 and guide links 22 articulate about the pin 26. Alternatively, a different form of pivot joint, such as a rocker joint, could be used to pivotally connect the rows 36 and 46 of the chain 20.

The chain 20 forms an endless loop having teeth 52 of the links 24 extend toward the region within the loop. The surface of the chain 20 that forms the interior of the loop is the front side 38 of the chain 20. The surface of the chain 20 that is opposite the front side of the chain and faces outwardly from the region within the endless loop, is the back side 40 of the chain 20.

Figure 9:
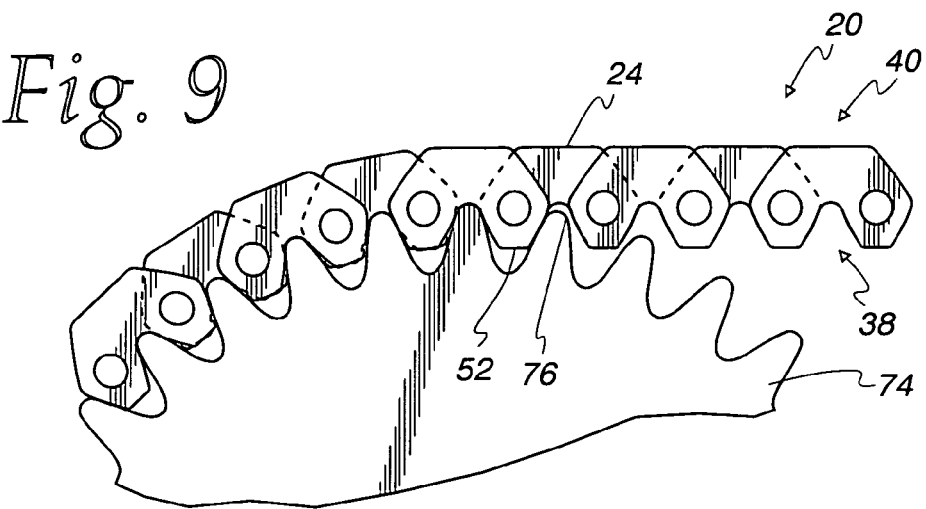
FIG. 9 is a side section view of a section of the chain shown by FIG. 4 in front side engagement with a sprocket.

As shown by FIG. 9, the teeth 52 along the front side 38 of the chain 20 will mesh with a sprocket 74 within the endless loop formed by chain 20 in a manner that is conventional for front drive silent chain and sprocket engagement. As the chain 20 wraps about the sprocket 74, the front-driven sprocket 74 positions a tooth 76 between the teeth 52 of every drive link 24 in the first series 34 and the second series 44. Thus, every drive link 24 engages a tooth 76 of the sprocket 74 at each end along its chain direction and between teeth 52. The engagement of the sprocket 74 and front side 38 of the chain 20 is referred to as single tooth spacing.

FIG. 5 shows an oblique view of sprocket 10. The teeth 12 of each series 14 and 16, are spaced from adjacent teeth 12 of the series to accept the back side of a drive link 24 between adjacent teeth 12 and to engage the back flanks 58 of the drive link 24. The teeth 12 of the two series, 14 and 16, are offset from each other along the circumference of the sprocket 12 so that the teeth 12 of the series 14 extend between the drive links 24 of the series 34 and the teeth 12 of the series 16 extend between the drive links 24 of the series 44.

FIG. 4 shows the back side 40 of the silent chain 20 engaging the teeth 12 of the sprocket 10. The sprocket teeth 12 of first series 14 and second series 16 are separated from adjacent teeth in the series by the length of the drive links 24 along a chain direction of the chain 20. The teeth 12 of the first series 14 and the second series 16 are not laterally aligned, but rather are offset along the sprocket such that the teeth 12 of the first series 14 extend between the drive links 24 of the first series 34 and the teeth 12 of the second series 16 extend between the drive links 24 of the second series 44 as the back side 40 of the chain 20 wraps around sprocket 10. The faces 18 of the sprocket teeth 12 are adjacent to the back flanks 58 of the drive links 24.

The sprocket teeth 12 extend into the back side 40 of the chain 20 at a distance that is only half the length of the drive links 24 by alternately extending between drive links 24 of the first series 34 and second series 44. Thus, the sprocket 10 engages the back side 40 of the chain 20 at single tooth spacing, and reduces the chordal fall motion associated with back-driven silent chain applications. Engagement of single tooth spacing also reduces the inefficiency and problems of wear of other components, such as chain guides, associated with the use of a shoulder in some applications.

While the previous discussion pertains to the use of a chain according to the present invention for back driving an inverted tooth silent chain, other embodiments of the present invention may be used in other applications involving front and back driving, or only front driving. More drive links may be included in each row of links. Rather than a single group of side-by-side links or shown by FIGS. 6 and 7, a row could include additional groups of drive links that are separated from the group of drive links shown by FIGS. 6 and 7 in a lateral direction away from the guide link. In that case, each interleaved series would include one or more groups of drive links that would be interleaved between groups of drive links of adjacent rows of links. Further, the front and back sides of the drive links may be substantially identical, or any other properly meshing configuration.

Figure 10:
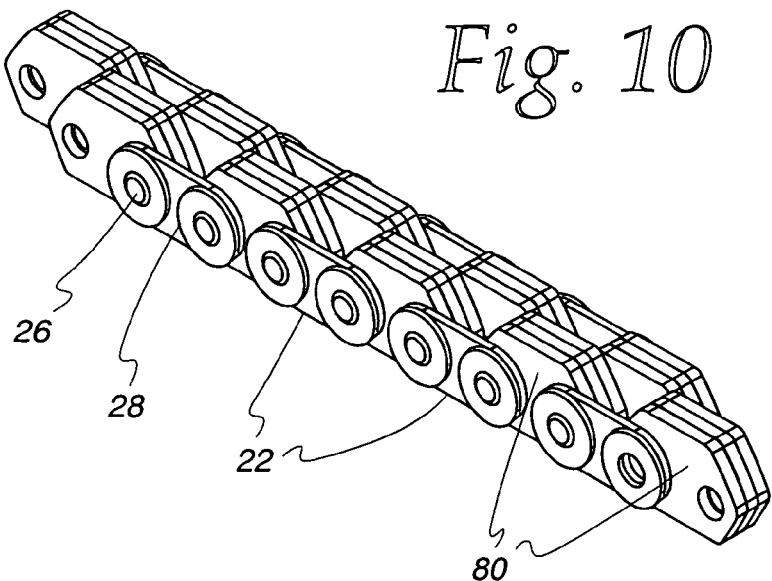
FIG. 10 is an oblique view of a section of a power transmission chain according to another embodiment of the present invention.
Figure 11:
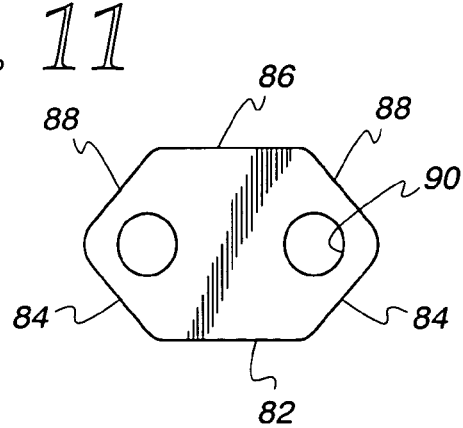
FIG. 11 is a side view of a drive link of the power transmission chain shown by FIG. 10.

FIG. 10 illustrates an alternate embodiment of the present invention featuring drive links 80 with substantially identical front and back sides. As shown in FIG. 11, the drive link 80 comprises a front surface 82 adjacent to two front flanks 84. Opposite the front surface 82 of the drive link 80 is a back surface 86. Adjacent to the back surface 86 at either end along the chain direction are back flanks 88. Drive link 90 also defines two apertures 90 that are sized to receive pivot members, such as pins. In the embodiment illustrated, the front and back sides of drive link 80 are symmetric about a line including the center points of the two apertures 90. Thus, a chain comprised of drive links 80 (which have substantially identical front and back sides) could be wrapped about similar sprockets, such as sprocket 10 of FIG. 5, for both front and back driving.

The drive link 80 does not have a crotch or cutout typical of inverted teeth. Eliminating the cutout increases the strength and stiffness of the link and allows a reduction in mass for comparable load carrying capabilities. By using such a design with a offset tooth sprocket (such as shown in FIG. 5) and alternating guide links which facilitate a more uniformly stiff chain, an efficient chain is provided that does not experience the chordal fall associated with double tooth spacing.

While the invention has been described in connection with preferred embodiments, it will be understood that those embodiments are not the limit of the invention. Rather, the invention covers all alternatives, modifications, and equivalents within the spirit and scope of the invention as defined by the appended claims.

What is claimed is:

1. A power transmission chain comprising:
  the chain having a front side adapted to drive a front side drive sprocket and a backside adapted to drive a backside drive sprocket;
  a first series of links comprising a plurality rows of links positioned adjacent to each other and separated along a chain direction, the rows of the first series of links including:
    a guide link and a drive link, the guide link separated from the drive link in a first lateral direction that is perpendicular to the chain direction, and the guide link and the drive link being substantially the same length along the chain direction;
  a second series of links comprising a plurality rows of links positioned adjacent to each other and separated along the chain direction, the rows of the second series of links including:
    a guide link and a drive link, the guide link separated from the drive link in a second lateral direction that is perpendicular to the chain direction and opposite the first lateral direction, the guide link and the drive link being substantially the same length along the chain direction;
  the drive links of the first and second series each comprising two front side chain teeth extending from the drive link along the front side of the chain in a direction that is perpendicular to the chain direction and also perpendicular to the first and second lateral directions, the two front side chain teeth are adjacent to each other along the chain direction, and the two front side chain teeth define a region between the two front side chain teeth to accept a front side drive sprocket tooth;
  the drive links of the first and second series of links defining a backside surface opposite the two front side chain teeth, the backside surface comprising two backside drive flanks facing at least in part along the chain direction, one backside drive flank being disposed at a first end of the drive link along the chain direction and another backside drive flank being disposed at a second end of the drive link opposite the first end of the drive link along the chain direction, the drive flanks at the first and second ends of the drive links spaced from each other by a distance that permits the drive flanks to contact driving surfaces of adjacent teeth of the backside drive sprocket;
  the guide links of the first and second series extend adjacent to the region between the two front side chain teeth of the drive links;

the rows of the first series of links are separated along the chain direction by a distance that is less than a length along the chain direction of the links of the second series, the rows of the second series of links are separated along the chain direction by a distance that is less than a length along the chain direction of the links of the first series;

the first series of links and the second series of links are interleaved along the chain direction so that a row of links of the second series is positioned between and extending adjacent to links of adjacent rows of the first series and a row of links of the first series is positioned between and extending adjacent to links of adjacent rows of the second series, the drive link of each interleaved row of the first series extending between and adjacent to the drive link and guide link of each row of the second series adjacent to the drive link of the row of the first series and the drive link of each interleaved row of the second series extending between and adjacent to the drive link and guide link of each row of the first series adjacent to the drive link of the row of the second series;

each row of links of the first series are pivotally connected to each row of links of the second series interleaved with the row of links of the first series at locations near the ends of the links of the first series along the chain direction where the adjacent rows of the first series of links and the second series of links are interleaved;

each row of links of the second series are pivotally connected to each row of links of the first series interleaved with the row of links of the second series at locations near the ends of the links of the second series along the chain direction where the adjacent rows of the first series of links and second series of links are interleaved;

wherein separations along the chain direction between ends of drive links of adjacent rows of the first series of links are adjacent to the drive links of the second series of links and separations along the chain direction between ends of drive links of adjacent rows of the second series of links are adjacent to the drive links of the first series of links and the guide links of alternate rows of links along the chain direction are positioned on opposite lateral sides of the power transmission chain.

2. The power transmission chain according to claim 1, wherein the interleaved links of each row form apertures that are aligned in the lateral directions and the interleaved links are pivotally connected by pins extending through the aligned apertures.

3. The power transmission chain according to claim 1, wherein the guide link and the drive links provide uniform stiffness across the row of links.

4. The power transmission chain according to claim 3, wherein the rows of links include a plurality of drive links, the plurality of drive links providing drive link stiffness arid uniform stiffness across the rows of links.

* * * * *